United States Patent Office 3,533,818
Patented Oct. 13, 1970

3,533,818
MIXTURES OF WATER-INSOLUBLE DISAZO DYESTUFFS AND PROCESS FOR PREPARING THEM
Wolfgang Bandel, Kelkheim, Taunus, and Joachim Ribka, Offenbach am Main, Germany, assignors to Farbwerke Hoechst Aktiengesellschaft vormals Meister Lucius & Bruning, Frankfurt am Main, Germany, a corporation of Germany
No Drawing. Filed Aug. 17, 1966, Ser. No. 572,925
Claims priority, application Germany, Aug. 20, 1965, F 46,949
Int. Cl. C08h 17/14
U.S. Cl. 106—288       2 Claims

ABSTRACT OF THE DISCLOSURE

The present invention relates to new mixtures of water-insoluble disazo dyestuffs and to a process for preparing them; in particular it relates to mixtures of one symmetrical disazo dyestuff of the general formula (1)

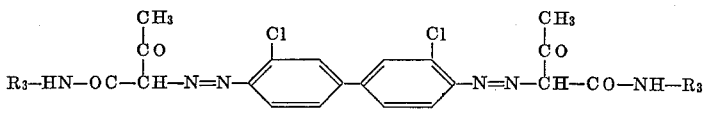

and at least two different symmetrical disazo dyestuffs of the general Formula 2

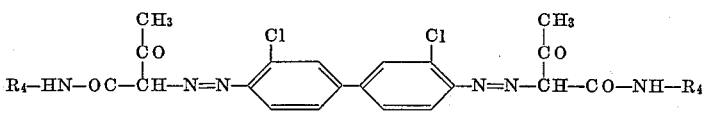

and of the corresponding number of asymmetrical disazo dyestuffs of the general Formula 3

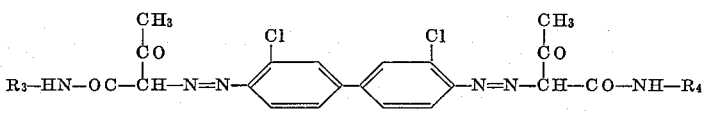

in which $R_3$ represents a phenyl radical which may be substituted by alkyl or alkoxy groups or chlorine atoms, or a naphthyl radical, and $R_4$ represents an aromatic or heterocyclic radical which may be substituted by one or several non-hydrosolubilizing groups.

It has now been found that mixtures of water-insoluble disazo dyestuffs of similarly good properties are obtained, by coupling 1 mol of tetrazotized 4,4'-diamino-3,3'-dichlorodiphenyl with two mols of a mixture of at least three different coupling components corresponding to the general formulae

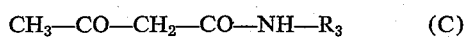
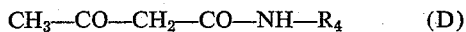

wherein one coupling component corresponds to the Formula C and at least two further coupling components to the Formula D and in which $R_3$ represents a phenyl radical which may be substituted by alkyl or alkoxy groups or by chlorine atoms, or a naphthyl radical and $R_4$ represents an aromatic or heterocyclic radical which may be substituted by one or several non-hydrosolubilizing groups wherein the hydrosolubilizing carboxylic acid and sulfonic acid groups are not used.

The dyestuffs may be prepared according to known methods by coupling the tetrazotized diamine with a mixture of the coupling components, for example, in an aqueous medium, suitably in the presence of a nonionic, anion-active or cation-active dispersing agent or in the presence of an organic solvent such as, for example, pyridine, quinoline or dimethylformamide. To improve the quality of the grain of the pigments obtained, it may be of advantage to heat, for example to boil, the aqueous coupling mixture for some time, with simultaneous addition of small amounts of an organic solvent, for example pyridine, chlorobenzene, a phthalic acid dialkyl ester or a resin soap.

The coupling components may be admixed with one another, depending on the properties required of the pigment to be prepared. The molar portion of each coupling component of Formulae C and D in the mixture of the coupling components may range for example, between 0.10 and 1.80 mols. The mixture of the disazo dyestuffs obtained, consists of symmetrical and asymmetrical dyestuffs of Formulae 1 to 3.

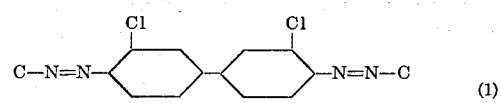

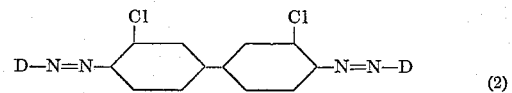

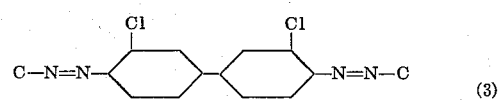

in which C and D represent the radicals of the above-mentioned coupling components and, since at least two different coupling components of Formula D are used, symmetrical as well as asymmetrical disazo dyestuffs are falling within the general Formula 2.

The portion of the various dyestuffs of Formulae 1 to 3 in the disazo dyestuff mixture depends on the ratio of the various coupling components to one another as well as of the coupling conditions and the coupling energy of the coupling components. The portion of the asymmetrical disazo dyestuffs of Formulae 2 and 3, hitherto unknown, may, in various cases, be determined by means of a mass spectrometer. As coupling components of the general Formula C there can be used, for example, acetoacetylamino compounds of anilines as well as of various isomeric aminomethylbenzenes, aminoethylbenzenes, aminomethoxybenzenes, aminoethoxybenzenes, aminochlorobenzenes, amino-di- and tri-methylbenzenes, aminodimethoxybenzenes, aminodichlorobenzenes, aminomethylmethoxybenzenes, aminomethylethoxybenzenes, aminomethylchlorobenzenes, aminomethoxychlorobenzenes, aminoethoxychlorobenzenes, aminodimethylmethoxybenzenes, aminodimethylchlorobenzenes, aminodimethoxymethylbenzenes, aminodiethoxybenzenes, aminodimethoxychlorobenzenes, aminodiethoxychlorobenzenes, aminodichloromethoxybenzenes, or aminonaphthalenes.

As coupling components of the general Formula D may be used, for example, compounds of the composition as mentioned for coupling component A. Furthermore, acetoacetylaminobenzenes may be used which may contain, in the benzene radical, nitro- groups, acetylamino-, benzoylamino, carboxylic acid amide-, sulfonic acid amide-, trifluormethyl- or cyano groups. Furthermore, as coupling components of Formula D, there may be used acetoacetylamino compounds of primary heterocyclic amines which may be substituted by non-water-solubilizing groups for example, of pyridine, benzimidazol, benzimidazolone, benzotriazol, indazol, quinoline, benzothiazol, carbazol or diphenylene oxide.

The disazo dyestuffs obtained are water-insoluble pigments which are distinguished by good fastness properties to light and to solvents. They are suitable for dyeing plastic masses, synthetic and natural resins, lacquers and lake-formers, for dyeing spinning masses as well as dyeing and printing paper and textile according to the known pigment printing and dyeing processes. Owing to their excellent properties of technical applicability, the new dyestuffs are especially suitable for the manufacture of printing colours which are especially distinguished by a good rheological quality of the printing pastes and high tinctorial strength and transparency of the dyeings.

The following Examples serve to illustrate the invention but they are not intended to limit it thereto, the parts being by weight, unless otherwise stated.

EXAMPLE 1

12.2 parts of 1-acetoacetylaminobenzene, 14.1 parts of 1-acetoacetylamino-2,4-dimethylbenzene and 14.2 parts of 1-acetoacetylamino-2-methoxybenzene are dissolved at room temperature in 500 parts by volume of water and 45 parts by volume of 5 N sodium hydroxide solution. The clarified solution is introduced, at 3° C. within about 30 minutes, into a mixture of 650 parts by volume of water and 15 parts by volume of glacial acetic acid. Then an aqueous solution of 55 parts of crystallized sodium acetate is added, and coupling is effected at room temperature within one hour with a solution of tetrazotized 4,4'-diamino-3,3'-dichlorodiphenyl (prepared by stirring 25.3 parts of 4,4'-diamino-3,3'-dichlorodiphenyl with 122 parts by volume of 5 N hydrochloric acid and 350 parts by volume of water by tetrazotizing with 40 ml. of a 5 N sodium nitrite solution and by clarifying the tetrazotized solution by means of silica gel). When coupling is completed, the mixture is heated to 90°–95° C. and kept at this temperature for 20 minutes and the dyestuff is filtered off with suction. It is washed and dried at 60° C. A pigment dyestuff is obtained which, incorporated into a printing colour suitable for graphical purposes, yields yellow dyeings of excellent tinctorial strength and transparency.

EXAMPLE 2

9.2 parts of 1-acetoacetylaminobenzene, 10.6 parts of 1-acetoacetylamino-2,4-dimethylbenzene, 10.7 parts of 1-acetoacetylamino-2-methoxybenzene and 9.8 parts of 1-acetoacetylamino-4-methylbenzene are dissolved, at room temperature while stirring, in a mixture of 500 parts by volume of water and 46 parts by volume of a 5 N sodium hydroxide solution. This solution as well as an aqueous solution of 4 parts of resin soap are added simultaneously, at about 3° C., into a mixture of 350 parts by volume of water and 20 parts of glacial acetic acid. Then an aqueous solution of 50 parts of crystallized sodium acetate is added and coupling is effected, at 18°–20° C. within 30 to 60 minutes, with a solution of tetrazotized 4,4'-diamino-3,3'-dichlorodiphenyl. (Preparation as described in Example 1.)

When coupling is completed, the reaction mixture is heated to about 90° C., kept at this temperature for 20 minutes and the dyestuff is filtered off with suction. It is washed and dried at 60° C.

A pigment dyestuff is obtained which, incorporated into a printing colour suitable for graphical purposes, yields a medium yellow dyeing of excellent tinctorial strength and transparency.

EXAMPLE 3

7.4 parts of 1-acetoacetylaminobenzene, 8.5 parts of 1-acetoacetylamino-2,4-dimethylbenzene, 8.6 parts of 1-acetoacetylamino-2-methoxybenzene, 7.9 parts of 1-acetoacetylamino-4-methylbenzene and 7.9 parts of 1-acetoacetylamino-2-methylbenzene are dissolved, at room temperature while stirring, in a mixture of 320 parts by volume of water and 50 parts by volume of a 5 N sodium hydroxide solution. This solution is introduced, at 0°–5° C. within about 30 minutes while stirring, into a solution of 340 parts by volume of water, 18 parts by volume of glacial acetic acid and 1.5 parts of a reaction mixture of about 20 mols of ethylene oxide on 1 mol of octadecyl alcohol. To the fine suspension obtained there is added within 30 to 30 minutes at about 18° C. a solution of tetrazotized $4,4_2$-diamino-3,3'-dichlorodiphenyl (prepared according to Example 1). By simultaneously adding a dilute aqueous sodium acetate solution, the pH value of the coupling mixture is kept at about 4 to 4.5. When coupling is completed, an aqueous solution of 10 parts of calcium chloride and an aqueous solution of 14 parts of resin soap are added to the reaction mixture. The whole is heated to 90° C., kept at this temperature for 30 minutes and the dyestuff that has formed is filtered off with suction, washed and dried.

A pigment dyestuff is obtained which, incorporated into a printing colour suitable for graphical purposes, yields medium yellow dyeings of excellent tinctorial strength and transparency.

When using the same amount of oleylamine acetate or dibutylnaphthalene sulfonic acid, instead of the reaction mixture of 20 mols of ethylene oxide and 1 mol of octadecyl alcohol, and, as for the rest, processing is carried out in the above-described manner, a pigment dyestuff is obtained which, incorporated into a printing colour suitable for graphical purposes, yields a more transparent yellow dyeing.

EXAMPLE 4

28.2 parts of 1-acetacetylamino-2,5-dimethoxy-4-chlorobenzene, 12.5 parts of 1-acetoacetylamino-2-methoxy-4-chlorobenzene and 12.2 parts of 1-acetoacetylamino-2,5-dimethoxybenzene are dissolved, at room temperature, in a mixture of 320 parts by volume of water and 50 parts by volume of a 5 N sodium hydroxide solution. The solution is clarified with silica gel and the filtrate is introduced, at 0° C. within about 30 minutes, into a mixture of 340 parts by volume of water, 18 parts by volume of glacial acetic acid and an aqueous solution of 1.5 parts of a reaction product of about 20 mols of ethylene oxide and 1 mol of octadecyl alcohol. To the fine suspension obtained, there is added at 20° C. within about one hour, the solution of tetrazotized 4,4'-diamino-3,3'-dichlorodiphenyl (prepared according to Example 1). By simultaneously adding an aqueous sodium acetate solution, the pH value of the coupling mixture is kept at 4 to 4.5.

When coupling is completed, stirring is continued for one hour, then an aqueous solution of 14 parts of resin soap is added, the coupling mixture is heated to 90° C. and kept at this temperature for 20 to 30 minutes. The dyestuff that has formed is filtered off with suction, washed and dried. When the pigment dyestuff obtained is incorporated with a lacquer, yellow lacquerings of excellent transparency are obtained.

EXAMPLE 5

24.4 parts of 1-acetoacetylaminobenzene, 7.1 parts of 1-acetoacetylamino-2-methoxybenzene and 6.6 parts of 1-acetoacetylamino-2-methylbenzene are dissolved, at room temperature, in 500 parts by volume of water and 45 parts by volume of a 5 N sodium hydroxide solution. The clarified solution is introduced at 3° C. within about 30 minutes into a mixture of 650 parts by volume of water and 15 parts by volume of glacial acetic acid. Then, an aqueous solution of 55 parts of crystallized sodium acetate is added and coupling is effected at room temperature with a solution of tetrazotized 4,4′-diamino-3,3′-dichlorodiphenyl (prepared according to Example 1). After coupling the whole is stirred for one hour, 5 parts of o-dichlorobenzene are added, the whole is heated to 90°–95° C., kept at this temperature for 30 to 45 minutes, the dyestuff that has formed is filtered off with suction and dried at 60°–65° C.

A pigment dyestuff is obtained which, incorporated into a printing colour suitable for graphical purposes, yields dyeings of high tinctorial strength and transparency.

EXAMPLE 6

The process is carried out according to Example 1, but instead of using the mixtures of coupling components mentioned in Example 1, the following components are used:

(a) 18.5 parts of 1-acetoacetylaminobenzene, 4.25 parts of 1-acetoacetylamino-2,4-dimethylbenzene, 4.3 parts of 1-acetoacetylamino-2-methoxybenzene, 3.9 parts of 1-acetoacetylamino-4-methylbenzene, 3.9 parts of 1-acetoacetylamino-2-methylbenzene and 4.3 parts of 1-acetoacetylamino-4-methoxybenzene.

(b) 22.8 parts of 1-acetoacetylamino-2-ethoxybenzene, 14.7 parts of 1-acetoacetylamino-4-methylbenzene and 6.2 parts of 1-acetoacetylamino-2-methoxy-4-chlorobenzene.

(c) 32.2 parts of 1-acetoacetylaminobenzene, 2.5 parts of 1-acetoacetylamino-4-methylbenzene and 3.1 parts of 1-acetoacetylamino-2-methoxy-4-chlorobenzene.

(d) 29.5 parts of 1-acetoacetylamino-4-methylbenzene, 5.3 parts of 1-acetoacetylaminonaphthalene and 5.7 parts of 1-acetoacetylamino-2-methyl-4-chlorobenzene.

(e) 21.7 parts of 1-acetoacetylamino-2-methoxy-4-chlorobenzene, 18.5 parts of acetoacetylaminobenzene and 3.3 parts of 1-(acetoacetylamino)-benzene-3-sulfonic acid amide.

(f) 21.3 parts of 1-acetoacetylaminonaphthalene, 17.5 parts of 1-acetoacetylamino-2-methylbenzene and 2.8 parts of 1-(acetoacetylamino)-benzene-3-carboxylic acid amide.

When incorporated into a printing paste suitable for graphical purposes the dyestuffs obtained yield yellow dyeings of high tinctorial strength and transparency.

EXAMPLE 7

The process is carried out according to Example 3, but instead of using the mixtures of coupling components mentioned in Example 3 the following mixtures are used:

(a) 24.4 parts of 1-acetoacetylamino-2,5-dimethoxybenzene, 12 parts of 5-(acetoacetylamino)-benzimidazolone, 7.6 parts of 3-acetoacetylamino)-2-methoxydiphenylene-oxide and 6.5 parts of 1-acetoacetylamino-2,5-dimethoxy-4-cyanobenzene.

(b) 21.2 parts of 1-acetoacetylamino-2,4-dimethylbenzene, 11.1 parts of 1-acetoacetylamino-2-ethylbenzene, 5.6 parts of 6-acetoacetylamino-benzimidazol, 2.7 parts of 1-acetoacetylamino-2-chlorobenzene and 2.9 parts of 1-acetoacetylamino-4-nitrobenzene.

(c) 11.4 parts of 1-acetoacetylamino-2-methoxybenzene, 12 parts of 1-acetoacetylamino-4-acetylaminobenzene, 9.1 parts of 1-acetoacetylamino-2,5-dimethoxy-4-benzoylaminobenzene and 6.8 parts of 2-acetoacetylamino-6-ethoxybenzothiazol.

When incorporating into a printing colour suitable for graphical purposes the dyestuffs obtained yield yellow dyeings of high tinctorial strength and transparency.

We claim:

1. Mixtures of water-insoluble disazo-dyestuffs consisting of a symmetrical dyestuff of the formula

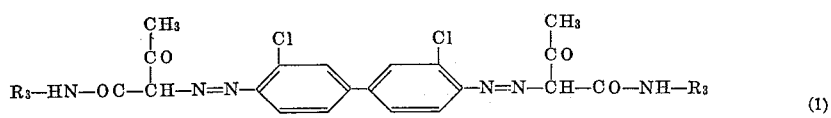

and 2 to 5 symmetrical disazo-dyestuffs of the formula

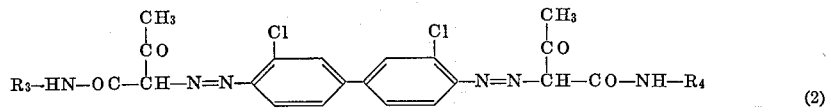

and of the corresponding number of asymmetrical disazo-dyestuffs of the formula

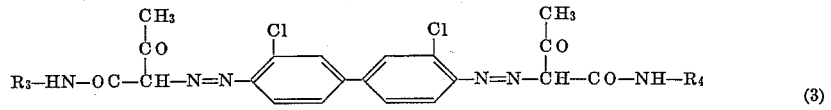

in which $R_3$ represents phenyl or phenyl substituted by lower alkyl, lower alkoxy or chlorine, or a naphthyl radical, and $R_4$ represents phenyl or phenyl substituted by lower alkyl, lower alkoxy, chlorine, nitro, cyano, sulfonamide, carboxylic acid amide, acetylamino or benzoylamino, or a naphthyl, benzimidazolone, diphenylene oxide, benzthiazole or 6-ethoxybenzthiazole radical, with the proviso that the radicals $R_3$ and $R_4$ in the above formulae being always different, obtained by coupling 1 mol of tetrazotized 4,4′-diamino-3,3′-dichlorodiphenyl with 2 mols of a mixture of coupling components consisting of a coupling component of the formula

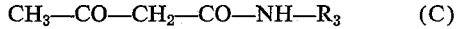

and 2 to 5 further different coupling components of the general formula

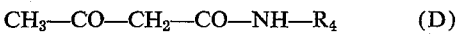

in which $R_3$ and $R_4$ have the meanings given above, the molar proportion of each of the coupling components of the general formulae C and D in the employed mixture of coupling components being between 0.10 mol and 1.80 mol.

2. A process for the preparation of mixtures of water-insoluble disazo-dyestuffs, which comprises coupling 1 mol of tetrazotized 4,4′-diamino-3,3′-dichlorodiphenyl with 2 mols of a mixture of coupling components consisting of a coupling component of the formula

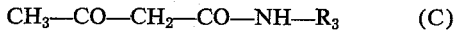

and 2 to 5 further different coupling components of the formula

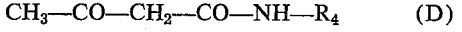

in which $R_3$ represents phenyl or phenyl substituted by lower alkyl, lower alkoxy or chlorine, or a naphthyl radical, and $R_4$ represents phenyl or phenyl substituted by lower alkyl, lower alkoxy, chlorine, nitro, cyano, sulfonamide, carboxylic acid amide, acetylamino or benzoylamino, or a naphthyl, benzimidazolone, diphenylene oxide, benzthiazole or 6-ethoxybenzthiazole radical, with the proviso that the radicals $R_3$ and $R_4$ in the above formula being always different, the molar proportion of each of the coupling components of the general formulae C and D in the employed mixture of coupling components being between 0.10 mol and 1.80 mol.

References Cited

UNITED STATES PATENTS

| | | | |
|---|---|---|---|
| 3,317,331 | 5/1967 | Lenoir et al. | 106—288 |
| 3,446,640 | 5/1969 | Orlova et al. | 106—288 |

OTHER REFERENCES

Lubs: Chemistry of Synthetic Dyes and Pigments, Reinhold Publ. Corp., N.Y., 1955, p. 636.

JAMES E. POER, Primary Examiner